United States Patent

Oonishi et al.

Patent Number: 4,617,365
Date of Patent: Oct. 14, 1986

[54] ETHYLENE COPOLYMER

[75] Inventors: Akiyoshi Oonishi; Shuhei Doi; Takeo Shimada, all of Mie, Japan

[73] Assignee: Mitsubishi Petrochemical Co., Ltd., Tokyo, Japan

[21] Appl. No.: 782,564

[22] Filed: Oct. 1, 1985

[30] Foreign Application Priority Data

Oct. 1, 1984 [JP] Japan .................... 59-206101

[51] Int. Cl.⁴ .......................... C08F 210/02
[52] U.S. Cl. ..................... 526/265; 524/516; 524/548; 525/203
[58] Field of Search ......................... 526/265

[56] References Cited

U.S. PATENT DOCUMENTS 4,554,334  11/1985  Yuki et al. .................... 526/265

Primary Examiner—Harry Wong, Jr.
Attorney, Agent, or Firm—Oblon, Fisher, Spivak, McClelland & Maier

[57] ABSTRACT

An ethylene copolymer comprising ethylene and a compound of formula (I)

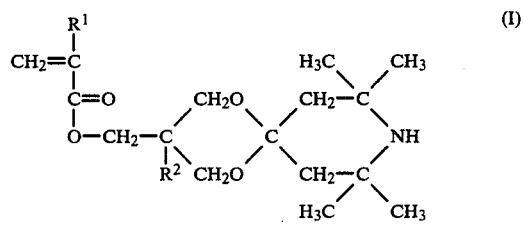

wherein $R^1$ represents a hydrogen atom or a methyl group, and $R^2$ represents a methyl group or an ethyl group, the content of the compound of formula (I) being from 0.005 to less than 10 mole %, and the copolymer being a random copolymer prepared by radical polymerization of ethylene and the compound of formula (I).

2 Claims, No Drawings

ETHYLENE COPOLYMER

FIELD OF THE INVENTION

The present invention relates to a novel ethylene copolymer. The ethylene copolymer according to the present invention has an excellent weatherability.

BACKGROUND OF THE INVENTION

Ethylene copolymers are inexpensive and have excellent molding properties, and also have excellent physical properties such as transparency, strength and the like. Therefore, the ethylene copolymers are practically used in a wide field.

However, the weatherability of ethylene copolymers is not always sufficient, and as a result, the ethylene copolymers have the restriction in the outdoor use where they are exposed to direct sunlight. A method of adding additives such as benzophenone-based UV absorbers, benzotriazole-based UV absorbers, hindered amine-based photostabilizers or the like is conventional as a method for improving the weatherability of ethylene copolymers. However, the improvement effect is not sufficient due to bleed out of additives. The tendency of this bleed out is particularly remarkable in a product of a thin thickness such as a film. It is proposed to minimize the bleed out by increasing the molecular weight of additives.

For example, Japanese Patent Application (OPI) Nos. 126240/76 and 137358/82 disclose this proposal (the term "OPI" as used herein refers to "published unexamined Japanese patent application"). The effect by the increase of molecular weight of additives can be expected from the standpoint of the bleed out property. However, in the case of adding to non-polar solvents such as polyethylene, dispersibility of additives is not sufficient and a sufficient effect cannot be always exhibited.

SUMMARY OF THE INVENTION

The present invention intends to overcome the above-described problems encountered in the prior art.

Accordingly, an object of the present invention is to provide an ethylene copolymer having an excellent weatherability which is obtained by random copolymerization of ethylene and a specific weatherability improving component.

The ethylene copolymer is a random copolymer free from bleed out of the weatherability improving component and containing the weatherability improving component uniformly dispersed therein in an amount of from 0.005 to less than 10 mole %.

DETAILED DESCRIPTION OF THE INVENTION

The weatherability improving component which is copolymerized with ethylene according to the present invention is a compound of formula (I)

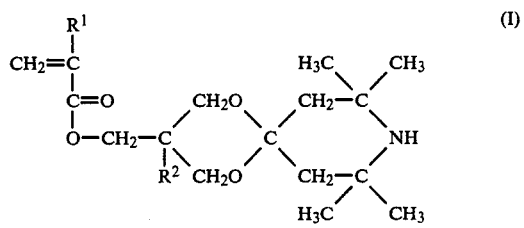

wherein $R^1$ represents a hydrogen atom or a methyl group, and $R^2$ represents a methyl group or an ethyl group.

The content of the compound of formula (I) in the copolymer is from 0.005 to less than 10 mole %. If the content is thereof is 10 mole % or more, the inherent characteristics, i.e., low price, high molding properties and good physical properties, of the ethylene copolymer are deteriorated. Further, the proportion of the compound of formula (I) introduced in the copolymer to the amount thereof fed tends to decrease. This is not undesirable not only from the standpoint of polymerization operations but also the economical standpoint since it results in a substantial loss of the compound of formula (I) which is far expensive than ethylene.

The ethylene copolymer of the present invention can be used by blending it with other polymer. In this case, if the content of the compound of formula (I) in the ethylene copolymer is 10 mole % or more, the blending properties (compatibility) between the ethylene copolymer and other polymer are decreased and the excellent weatherability of the ethylene copolymer cannot be exhibited. On the other hand, if the content thereof is less than 0.005 mole %, the weatherability improving effect is poor.

The ethylene copolymer according to the present invention is substantially a random copolymer of ethylene and the compound of formula (I). It is important in the present invention that the compound of formula (I) which is the weatherability improving component is uniformly present in a component comprising ethylene which should be protected from weathering. If the ethylene copolymer is substantially a block copolymer, the weatherability improving effect of the compound of formula (I) which is the weatherability improving component is reduced. The existence state of the compound of formula (I), further taken with the content thereof, substantially differs from the prior art which uses a homopolymer of the compound of formula (I) or a compound analogous thereto, or oligomers containing the compound of formula (I) in a high concentration of 10 mole % or more.

The copolymer of the present invention can contain minor amounts of comonomers in addition to ethylene and the compound of formula (I). Examples of such optional comonomers include vinyl esters such as vinyl acetate and vinyl propionate, acrylic esters such as methyl acrylate and ethyl acrylate, methacrylic esters such as methyl methacrylate and 2,2,6,6-tetramethylpyridyl-4 methacrylate, and unsaturated acids such as acrylic acid and methacrylic acid. These comonomers are preferably used in an amount of less than 10 mole %.

If the copolymer of the present invention is directly used to form molded products such as films, sheets and pipes, the copolymer preferably has a number average molecular weight of 10,000 or more. Copolymers having a number average molecular weight of less than 10,000 are not desirable since they cannot be molded into products having practically acceptable physical properties. If the copolymer of the present invention is used as a blend with 5 wt % or less of other polymers, its number average molecular weight may be less than 10,000 but should not be lower than 1,000; otherwise, the problem of "bleed out" may occur in the product.

It is particularly preferred for the copolymer of the present invention to be used by blending with a polyolefin such as a polyethylene, a polypropylene or an ethylene-propylene copolymer. In this case, the blending proportions (weight basis) of the polyolefin and the ethylene copolymer of the present invention are polyolefin: ethylene copolymer = 1000:1 to 0.1:1, preferably 500:1 to 0.1:1.

The copolymer of the present invention exhibits a high degree of weatherability in combination with the good inherent characteristics of ethylene copolymers. Therefore, it may advantageously be used as films for agricultural green houses, agricultural mulch films, pipes and associated parts intended for outdoor use, and in any other applications of ethylene copolymers that require high weatherability. These advantages of the copolymer of the present invention tion are not lost even if it is used as a blend with other polymers.

The copolymer of the present invention may also be used together with conventional additives incorporated to provide improved weatherability. Additives which can be used in the copolymer of the present invention include benzophenone-based UV absorbers, benzotriazole-based UV absorbers, hindered amine-based photostabilizers and nickel phenolate-based photostabilizers. Further, antioxidants such as phenolic compounds, sulfur compounds and phosphorus compounds can be added. Other additives which can be additionally incorporated in the copolymer of the present invention include metal deactivators, anti-blocking agents, slip agents, nucleating agents, antistatic agents, drip-proofing agents, flame retardants, cross-linking agents, voltage stabilizers and colorants.

The copolymer of the present invention is produced by subjecting the necessary monomers to copolymerization conditions. In this case, however, the monomer of formula (I) has a larger polymerizability as compared with that of ethylene. Therefore, the monomer of formula (I) is generally copolymerized with ethylene in the manner such that the amount of ethylene is from about 0.001 to 3 mol % on the basis of the total amount of the polymerization system. The copolymer can be produced with any of the apparatuses conventionally used in the production of high-pressure, low-density polyethylene.

The copolymer of the present invention is produced by radical polymerization, so that the catalyst used in the production of this copolymer is a radical initiator. Examples of the radical initiators include oxygen; dialkyl peroxides and their derivatives such as ditertiary butyl peroxide, tertiary butyl cumyl peroxide and dicumyl peroxide; diacyl peroxides such as diacetyl peroxide and dioctanoyl peroxide; peroxydicarbonates such as diisopropyl peroxydicarbonate and di-2-ethylhexylperoxydicarbonate; peroxy esters such as tertiary butyl peroxyisobutyrate, tertiary butyl peroxypivalate and tertiary butyl peroxylaurate; ketone peroxides such as methyl ethyl ketone peroxide and cyclohexanone peroxide; peroxy ketals such as 2,2-bis-tertiary butyl peroxyoctane and 1,1-bis(tertiary butyl peroxy)-cyclohexane; hydroperoxides such as tertiary butyl hydroperoxide and cumene hydroperoxide; and azo compounds such as 2,2'-azobisisobutyronitrile.

The copolymer of the present invention is preferably produced by a continuous polymerization method. The apparatus is a continuous stirred tank reactor or a continuous tubular reactor, both of which are commonly employed in the high-pressure radical polymerization of ethylene.

The polymerization is performed by a single zone method using a single unit of such reactors. Alternatively, a multiple zone method may be used with a plurality of reactors connected in series, optionally interconnected by coolers, or with a single reactor the interior of which is effectively divided into several reaction zones. In the usual practice of the multiple zone method, the characteristics of the polymer lots obtained in the respective reactors or reaction zones are controlled by properly changing the monomer composition, the catalyst concentration, the concentration of molecular weight modifier and other parameters for each of the reactors or reaction zones. In the series connection of reactors, two or more tank reactors or two or more tubular reactors can be combined; alternatively, one or more tank reactors can be combined with one or more tubular reactors.

The polymer formed in one or more reactors is separated from the unreacted monomers and can be subsequently treated, as done in the usual practice for the production of high-pressure polyethylene. A mixture of unreacted monomers is mixed with additional amounts of the same monomers, and the resulting mixture is re-pressurized and returned to the reactor. The monomers additionally added to the mixture of unreacted monomers have such a composition that the composition of the mixture becomes the same as that of the initial feed. Generally, the additional monomers have a composition that is substantially equal to the composition of the polymer isolated from the polymerization vessel.

The tank reactor is preferably used for the purpose of producing a copolymer with a uniform composition.

The catalysts are usually dissolved in solvents having a small chain transfer effect and are injected directly into the reactor using a high-pressure pump. Suitable solvents are hexane, heptane, white spirits, hydrocarbon oils, cyclohexane, toluene, aliphatic acid esters, and mixtures thereof.

The compound of formula (I) is also dissolved in such solvents having a small chain transfer effect and is injected directly into the reactor using a high-pressure pump.

Except for special cases, high-pressure radical polymerization is usually performed in the presence of chain transfer agents to adjust the molecular weight of the product. All chain transfer agents that are used in the conventional high-pressure radical polymerization can be used in the present invention. Examples thereof include alkanes such as ethane, propane, butane, hexane and heptane; alkenes such as propylene, butene and hexane; alcohols such as ethanol, methanol and propanol; ketones such as acetone and methyl ethyl ketone; and aldehydes such as acetaldehyde and propionaldehyde. Gaseous chain transfer agents are supplied to the intake side of a compressor and liquid agents are injected into the reaction system using a pump.

The polymerization pressure is at least 500 kg/cm$^2$, and preferably from 1,000 to 4,000 kg/cm$^2$.

The polymerization temperature is at least 120° C., and preferably from 150° to 300° C.

The copolymer of the present invention produced in the reactor is separated from the monomer mixture with a separator in accordance with any methods used in high-pressure pressure radical polymerization. The separated copolymer can be immediately used as the final product, but more often, it is subjected to various post-treatments that are conventionally used for the products obtained in high-pressure radical polymerization.

The following Examples are given to further illustrate the process for producing the copolymer of the present invention.

EXAMPLE 1

An autoclave-type continuous reactor having an inner capacity of 1.5 liters and equipped with a stirrer was continuously supplied with 30 kg/hr of ethylene, 0.9 liter/hr of an ethyl acetate solution of 400 g/liter of 3-acryloyloxymethyl-3 -ethyl-8,8,10,10-tetramethyl-9-aza-1,5-dioxaspiro(5,5)undecane dissolved in ethyl acetate, 440 liters/hr of proylene, and 0.54 liter/hr of a catalyst prepared in the form of a solution of 5 g/liter of tertiary butyl peroxypivalate dissolved in n-hexane. A copolymer was produced by conducting polymerization at a pressure of 2,400 kg/cm² and a temperature of 210° C.

The resulting copolymer had an MFR (Melt Flow Rate, JIS K 6760) of 3.0, and a NMR analysis revealed that the 3-acryloyloxymethyl-3-ethyl-8,8,10,10-tetramethyl-9-aza-1,5-dioxaspiro(5,5)undecane component was substantially randomly distributed in the polymer and the content thereof was 0.7 mol %.

EXAMPLE 2

An autoclave-type continuous reactor having an inner capacity of 1.5 liters and equipped with a stirrer was continuously fed with 30 kg/hr of ethylene, 2.8 liters/hr of an ethyl acetate solution of 400 g/liter of 3-acryloyloxy-methyl-3-ethyl-8,8,10,10-tetramethyl-9-aza-1,5-dioxaspiro-(5,5)undecane dissolved in ethyl acetate, 160 liters/hr of propylene, and 0.76 liter/hr of a catalyst prepared in the form of a solution of 5 g/liter of tertiary butyl peroxypivalate dissolved in n-hexane. A copolymer was produced by conducting polymerization at a pressure of 2,400 kg/cm² and a temperature of 210° C.

The resulting copolymer had an MFR of 4.0, and a routine NMR analysis revealed that the 3-acryloyloxymethyl-3-ethyl-8,8,10,10-tetramethyl-9-aza-1,5-dioxaspiro(5,5)undecane component was substantially randomly distributed in the polymer and the content thereof was 2.1 mol %.

EXAMPLE 3

An autoclave-type continuous reactor having an inner capacity of 1.5 liters and equipped with a stirrer was continuously fed with 30 kg/hr of ethylene, 5.6 liters/hr of an ethyl acetate solution of 400 g/liter of 3-methacryloyloxy-3-methyl-8,8,10,10-tetramethyl-9-aza-1,5-dioxaspiro(5,5)undecane dissolved in ethyl acetate, 4,900 liters/hr of propylene, and 1.3 liters/hr of a catalyst prepared in the form of 40 g/liter of tertiary butyl peroxylisobutyrate dissolved in n-hexane. A copolymer was produced by conducting polymerization at a pressure of 2,000 kg/cm² and a temperature of 220° C.

The resulting copolymer had a number average molecular weight of 3,900 as determined by GPC (gel permeation chromatography). A routine NMR analysis showed that the 3-methacryloyloxy- 3-methyl-8,8,10,10-tetramethyl-9-aza-1,5dioxaspiro(5,5)undecane component was substantially randomly distributed in the polymer and the content thereof was 2.1 mol %.

APPLICATION EXAMPLE 1

A blend of 29 parts by weight of a high-pressure ethylene homopolymer (MFR: 0.5, specific gravity: 0.922) and 1 part by weight of the copolymer prepared in Example 1 was shaped into a film having a thickness of 100 μm by the inflation method. This film was placed at a certain location in Yokkaichi, Miye, Japan, facing the south at an angle of 45°. After exposure to weathering for 3 years, the film was found to retain 95% of the elongation at break, indicating the extremely high weatherability of the film. A film made of the high-pressure ethylene homopolymer alone exhibited 50% or less of the elongation at break after it was exposed to weathering for 3 months. A film made of the same high-pressure polyethylene plus 0.2 wt % of Tinuvin 944 (higher molecular weight hindered amine-based photostabilizer) displayed 50% or less of the elongation at break after exposure of 10 months to weathering.

APPLICATION EXAMPLE 2

A blend of a propylene homopolymer (MFR: 4.0) and 0.2 wt % of the copolymer prepared in Example 3 was pelletized through an extruder (20 mm in diameter). The pellets were compression-molded at 230° C. into a sheet having a thickness of 0.5 mm. The sheet was exposed to light in a xenon type Weather-O-meter (6.5 kW, Atlas, U.S.A.) and the time required for the sheet to be deteriorated to such an extent that it breaks by 180° bending was measured. The time was 650 hours. The respective values for a sample not containing the polymer of the present invention and a sample containing Sanol LS 770 (hindered amine-based photostabilizer) were 160 hours and 500 hours. Each of the samples tested contained 0.10 wt % of Irganox RA 1010 (phenolic antioxidant) as an antioxidant.

While the invention has been described in detail and with reference to specific embodiments thereof, it will be apparent to one skilled in the art that various changes and modifications can be made therein without departing from the spirit and scope thereof.

What is claimed is:

1. An ethylene copolymer comprising ethylene and a compound of formula (I)

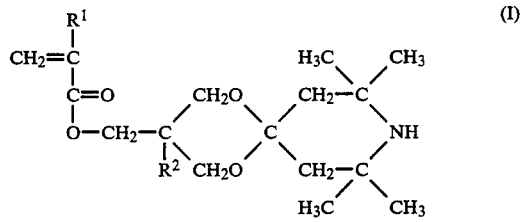

wherein $R^1$ represents a hydrogen atom or a methyl group, and $R^2$ represents a methyl group or an ethyl group, the content of the compound of formula (I) being from 0.005 to less than 10 mole %, and the copolymer being a random copolymer prepared by radical polymerization of ethylene and the compound of formula (I).

2. An ethylene copolymer as in claim 1, wherein the copolymer has a number average molecular weight of at least 1,000.

* * * * *